Aug. 27, 1974  G. H. BOWSER ET AL  3,832,254
METHOD OF MAKING A MULTIPLE GLAZED UNIT HAVING A
THERMOPLASTIC, SPACER-DEHYDRATOR ELEMENT
Filed Dec. 14, 1972  2 Sheets-Sheet 1

United States Patent Office 3,832,254
Patented Aug. 27, 1974

3,832,254
METHOD OF MAKING A MULTIPLE GLAZED UNIT HAVING A THERMOPLASTIC, SPACER-DEHYDRATOR ELEMENT
George H. Bowser, New Kensington, and Renato J. Mazzoni, Tarentum, Pa., assignors to PPG Industries, Inc., Pittsburgh, Pa.
Filed Dec. 14, 1972, Ser. No. 315,042
Int. Cl. B32b 1/04, 17/00; E04b 2/28; E06b 3/64; C03c 27/00
U.S. Cl. 156—107          22 Claims

ABSTRACT OF THE DISCLOSURE

In one embodiment of the invention, multiple glazed units are fabricated by heating a thermoplastic, spacer-dehydrator element. The element is heated to a temperature sufficient to make the element plastic and render the element surfaces viscid. A pair of glass sheets are positioned about the heated element and urged toward each other against the element to form a hermetic seal. In another embodiment, a composite strip composed of a strip of precured, mastic sealant material having a bendable carrier tape adhered to one surface and a thermoplastic, spacer-dehydrator element adhered to the opposite surface is heated. The composite strip is heated to a temperature sufficient to make the element plastic. A segment of the composite strip is applied to a pair of glass sheets held in spaced relationship to each other. The segment is applied in such a manner that the element is inserted between opposed, marginal edges of the glass sheets with the sealant material facing the peripheral edges of the glass sheets. Thereafter, the carrier tape is pressed so as to flow portions of the sealant material into hermetically sealing contact with the edges of the glass sheets to produce a finished unit. In still another embodiment, the composite strip, instead of including a precured, mastic sealant material, includes a curable, mastic sealant material. The composite strip is heated to a temperature sufficient to make the element plastic. Before the sealant material cures, the composite strip is applied, as before, to the pair of glass sheets. Thereafter, the pressing step is performed to produce a finished unit.

BACKGROUND OF THE INVENTION (1) Field of the Invention

This invention relates to a method of fabricating a multiple glazed unit having a thermoplastic, spacer-dehydrator element.

(2) Description of the Prior Art and Technical Problems

Multiple glazed units generally comprise two or more sheets of glass spaced from one another to provide an insulating air space between the sheets. One type of a multiple glazed unit and the manufacture thereof is disclosed in U.S. Pat. 3,669,785 issued to G. H. Bowser et al. on June 13, 1972 and entitled "Method for Fabricating a Multiple Glazed Unit"; U.S. Patent Application Ser. No. 250,717, filed on May 5, 1972, now U.S. Pat. 3,358,996, issued to G. H. Bowser and entitled "Multiple Glazed Unit"; and U.S. Pat. No. 3,733,237.

The type of multiple glazed units disclosed above are fabricated by supporting a first sheet of glass in opposed, predetermined spaced relationship above a second sheet of glass having the same size and dimensions as the first sheet of glass. Thereafter, a composite strip comprised of an elongated strip of flowable, mastic sealant material having a bendable carrier tape adhered to one surface and a resilient, thermoplastic, spacer-dehydrator element adhered to the opposite surface is affixed to the marginal and peripheral edges of the glass sheets. The composite strip is affixed such that the spacer-dehydrator element is between the marginal edges of the glass sheets while the mastic sealant material overlays the peripheral edges of the glass sheets. Prior to applying the composite strip around the corner of the glass sheets, a tool is used to cut or miter approximately a 90° notch in the spacer-dehydrator element. The carrier tape is then pressed so that portions of the mastic sealant material flow into hermetically sealing contact with the peripheral and marginal edges of the glass sheets.

The step of mitering the spacer-dehydrator element at the corners of the glass sheets is performed to prevent bunching up of the spacer-dehydrator element at the corners of the glass sheets. The bunching up of the element generates opposed forces which tend to push the glass sheets away from each other. More particularly, at the corners of the glass sheets, the surface of the element facing the space between the glass sheets is compressed. When this surface is compressed, opposed forces are generated which urge opposed surfaces of the element in contact with the corners of the glass sheets away from each other. As the opposed surfaces are urged away from each other, they push the glass sheets away from each other.

This pushing of the glass sheets away from each other is undesirable because it applies stresses to the corners of the glass sheet which (1) could cause the corners of the glass sheet to fracture, (2) prevents a uniform spacing between the glass sheets, and (3) could cause the hermetic seal to break by pushing the glass sheets apart at the corners.

It would therefore be advantageous from an economical standpoint if the mitering step could be eliminated during the fabrication of multiple glazed units while minimizing or eliminating the opposed forces generated by bunching of the spacer-dehydrator element at the corners of the glass sheets.

SUMMARY OF THE INVENTION

This invention contemplates a method of fabricating multiple glazed units. In one embodiment of the invention, a thermoplastic, spacer-dehydrator element is heated to a temperature at which (1) the element can be re-shaped and (2) the surfaces upon heating become viscid. A pair of glass sheets are positioned about the heating element. Thereafter, the glass sheets are urged toward each other against opposed viscid surfaces of the element to form a hermetic seal between the element and the glass sheets.

Further, this invention contemplates a method of fabricating multiple glazed units comprising the step of supporting a pair of glass sheets in opposed, spaced, relationship to each other. A length of a composite strip composed of a curable, mastic sealant material having a bendable carrier tape adhered to one surface and a thermoplastic, spacer-dehydrator element adhered to the opposite surface is provided. The composite strip is heated at a temperature at which the element becomes plastic, but at a temperature sufficiently low so as not to decompose the element. The heated composite strip is urged against the edges of the glass sheets within a time period before the sealant material cures. If the sealant material is allowed to cure, the sealant material will not wet the edges of the glass sheets, and a hermetic seal is not formed by the composite strip. The heated composite strip is affixed to the edges of the glass sheet such that the element is inserted between opposed, marginal edge portions of the glass sheets with the uncured sealant material overlaying the peripheral edges of the glass sheets.

Further, this invention contemplates the method of fabrication of multiple glazed units employing a composite strip including a precured, mastic sealant material instead of a curable, mastic sealant material. A length of the composite strip is heated to a temperature sufficient to allow reshaping of the element but not sufficient to decompose the element. The heated composite strip is urged against the edges of the glass sheets such that the element is inserted between opposed, marginal edge portions of the glass sheets with the sealant material overlaying the peripheral edges of the glass sheets.

In general, the heating step is performed to permit reshaping of the spacer-dehydrator element. The element is reshaped at the corners of the glass sheets to eliminate the forces associated with bunching. Upon cooling, the element maintains its new shape. By reshaping the element at the corners, the surface of the element facing the space between the glass sheets is not in compression. Therefore, the opposed forces normally generated by bunching are eliminated and the glass sheets are not pushed apart at the corners.

DESCRIPTION OF THE INVENTION

Figure 1:
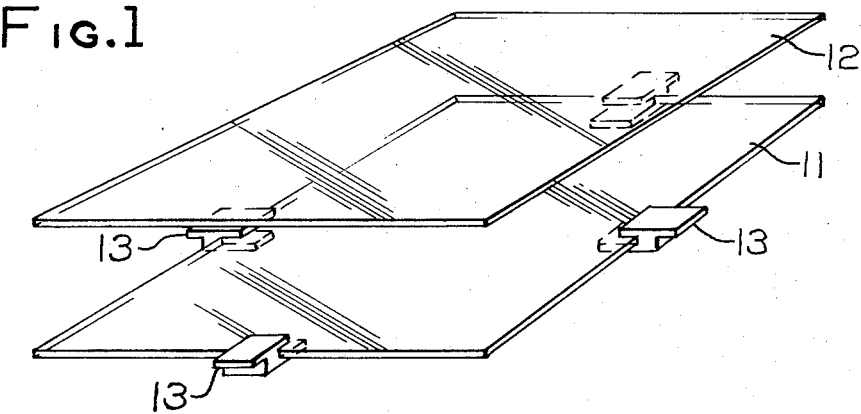
FIG. 1 is a schematic perspective view of an initial step in the process of this invention.

Multiple glazed units are generally constructed by placing a continuous length of a spacer-sealant, composite strip around the periphery of a pair of spaced, normally parallel glass sheets to provide an insulating air space between the sheets. The composite strip comprises a curable or precured mastic sealant material having a bendable carrier tape adhered to one surface and a resilient, thermoplastic, spacer-dehydrator element adhered to the opposite surface. The glass sheets are separated at their marginal edges by a continuous length of the spacer-dehydrator element, and hermetic sealing of the insulating air space is accomplished by the mastic sealant, which is moisture-resistant, being adhered or bonded to the spacer-dehydrator element and the peripheral edges of the glass sheets. A hand roller or other pressing facility may be conveniently used to press the mastic sealant material into sealing contact with the edges of the glass sheets and any flowing of the mastic sealant material that may occur is intended to be concealed by the slightly greater width of the carrier tape or ribbon over the original width of the mastic sealant strip.

For use in connection with this invention, the bendable carrier tape may be composed of any bendable material. Normally, the carrier tape is a strip of 7–8 mil aluminum foil. However, a strip of bendable plastic or other bendable material may be used, if desired.

Adhesive, moisture-ressitant mastic compositions within the contemplation of this invention are materials that are capable of cold flow at room temperature and include precured materials, such as disclosed in U.S. Pat. No. 2,974,377, as well as thermosetting and/or room temperature curable materials, such as disclosed in U.S. Pat. Nos. 3,076,777 and 3,320,333. Room temperature curable materials that cold flow to form a seal and cure to form a resilient structural bond are particularly desirable for use as an "edge-packing" or hermetic sealant in the construction of multiple glazed units.

The thermoplastic, spacer-dehydrator element is normally a resilient member. One such spacer-dehydrator element is fully disclosed in U.S. Pat. No. 3,358,996. Briefly, the thermoplastic, spacer-dehydrator element is preferably comprised of a powdered molecular sieve material dispersed in a matrix of a thermoplastic styrene-butadiene rubber block copolymer. Reference may be had to the aforesaid U.S. Pat. No. 3,358,996 for further details regarding the spacer-dehydrator element, its method of manufacture and ultimate use in multiple glazed window constructions.

In general, the spacer-dehydrator elements used to practice this invention are those that have thermoplastic properties, i.e., can be reshaped when heated and harden into a desired fixed form. It has been found that forces generated by bunching of the spacer-dehydrator element can be eliminated by heating and reshaping the element. More particularly, as an unheated spacer-dehydrator element is moved around the corners of a pair of glass sheets, the element bunches up. This is caused by putting the surface of the element facing the space between the glass sheet in compression. In the compressed state, forces are generated which act upon the opposite surfaces of the element in contact with the glass sheets. These forces tend to urge the opposed surfaces of the element outward which push the glass sheets apart. When a thermoplastic, spacer-dehydrator element is heated above a temperature at which the element becomes plastic, the element can be reshaped without setting up forces therein. Upon cooling, the element takes on its new shape and the forces associated with bunching are eliminated.

In the following description of the invention, the method will be practiced on a resilient, thermoplastic, spacer-dehydrator element having the following composition as shown in Table I.

TABLE I

| Ingredients: | Percent by weight |
| --- | --- |
| Styrene-butadiene rubber block copolymer (Thermolastic 226 or Kraton 3200–9000–0)* | 64 |
| Ethylene ethyl acrylate copolymer (Union Carbide DPDB 6169) | 16 |
| Molecular Sieve (powdered) | 20 |

*Kraton 3200–9000–0 is a block copolymer of styrene and butadiene rubber, manufactured by Shell Chemical Company; containing a black opacifier.

As can be appreciated by those skilled in the art, the above discussed thermoplastic, spacer-dehydrator element is only illustrative of one of many that may be used. Other types of spacer-dehydrator elements usable in the practice of this invention are disclosed in the aforementioned U.S. Pat. No. 3,358,996. The heating range of any particular spacer-dehydrator element should be sufficient to permit reshaping of the spacer-dehydrator element to minimize opposed forces generated by bunching but not sufficient to decompose the element.

FIRST EMBODIMENT OF THE INVENTION

In this embodiment of the invention, a multiple glazed unit is fabricated by urging a pair of rigid sheets, i.e., glass sheets, toward each other about a thermoplastic, spacer-dehydrator element which is heated to a temperature sufficient to (1) permit reshaping of the element and (2) to make the surfaces viscid, but not sufficient to decompose the element. For example, it has been found that heating the spacer-dehydrator element of Table I to 100° F. is sufficient to permit reshaping of the element to eliminate bunching. However, the surfaces of the element become viscid at temperatures above 275° F. Further, the spacer-dehydrator element decomposes at a temperature of about 400° F. Therefore, the temperature range for the thermoplastic, spacer-dehydrator element of Table I for the first embodiment of the invention is 275° F. to 400° F.

A length of the thermoplastic spacer-dehydrator element is heated to a temperature between 275° F.–400° F. The heated element is positioned between a pair of glass sheets to define a compartment therebetween. The glass sheets are urged toward each other in any conventional manner against the heated element to flow opposed, viscid surfaces of the element to form a hermetic seal. Pressure is maintained on the glass sheets until the element cools below the temperature at which the surfaces of the element become viscid, i.e., below 275° F.

As can be appreciated by those skilled in the art, a length of the resilient, thermoplastic, spacer-dehydrator element may be positioned between edge portions of the glass sheets and then heated. For example, after the element is selectively positioned between the glass sheets, the element is heated as by infrared to a temperature between 275° F.–400° F. The glass sheets are then urged toward each other to flow opposed surfaces of the element in contact with the glass sheets to form a hermetic seal. In the alternative, the sheets may be urged toward each other against the element and then heating the element to a temperature between 275°–400° F.

SECOND EMBODIMENT OF THE INVENTION

In this embodiment of the invention, multiple glazed unit is fabricated using a composite strip comprising a precured, flowable, mastic sealant material having a bendable carrier tape adhered to one surface and a thermoplastic, spacer-dehydrator element adhered to the opposite surface.

The precured, flowable, mastic sealant material used in the following discussion has the composition as shown in Table II below.

TABLE II

| Comment: | Percent by weight |
|---|---|
| Polyisobutylene (Vistanex LM, MS, molecular weight 10,000) | 61.2 |
| Butyl rubber (GR-1, molecular weight 60,000) | 30.6 |
| Zinc oxide | 3.1 |
| Para-dinitrosobenzene (Polyac) | 0.6 |
| Carbon black | 4.5 |

As will be appreciated by those skilled in the art, the precured, flowable mastic sealant is only illustrative of one that may be used. Other types of precured, mastic sealant materials are disclosed in U.S. Pat. 2,974,377.

The thermoplastic, spacer-dehydrator element is of the type shown in Table I. As can be appreciated by those skilled in the art, other thermoplastic, spacer-dehydrator elements may be used.

Prior to affixing the composite strip to the edges of a pair of rigid sheets, i.e., glass sheets, the composite strip is heated to a temperature sufficient to make the element plastic but not sufficient to decompose the element. For the element shown in Table I, the temperature range has been found to be about 100° F.–400° F.

In addition to softening the element, another advantage has been found in heating the composite strip. More parularly, when the composite strip is heated above room temperature, less pressure is required to flow the precured, mastic sealant material.

The heated composite strip is applied to the edges of a pair of glass sheets such that the thermoplastic, spacer-dehydrator element is inserted between opposed, marginal edge portions of the glass sheets with the precured, mastic sealant material facing the peripheral edges of the glass sheets. The carrier tape is then pressed in any conventional manner so as to flow portions of the precured sealant material into hermetically sealing contact with the peripheral edges of the glass sheets to produce a finished unit.

In the discussion of the second embodiment of the invention, the composite strip is heated prior to affixing it to the pair of glass sheets. As can be appreciated by those skilled in the art, the composite strip may be affixed to the glass sheets and then heated in any conventional manner.

THIRD EMBODIMENT OF THE INVENTION

In this embodiment of the invention, a multiple glazed unit is fabricated using a composite strip comprising a curable, flowable, mastic sealant material having a bendable carrier tape adhered to one surface and a thermoplastic, spacer-dehydrator element adhered to the opposite surface.

The curable, flowable mastic sealant material used in the following discussion has the composition as shown in Table III below.

TABLE III

Component A comprises:

| Ingredient: | Percent by weight |
|---|---|
| Butyl rubber | 18–35 |
| Polyisobutylene | 8–20 |
| Polybutene | 15–35 |
| Carbon black | 0–20 |
| Silica pigment | 2–15 |
| Lead dioxide | 0.8–3.2 |
| Silica pigment with hydroxy groups | 2.9–4.0 | and Component B comprises:

| Ingredient: | |
|---|---|
| Butyl rubber | 18–35 |
| Polyisobutylene | 10–18 |
| Polybutene | 15–35 |
| Silica pigment | 2–15 |
| Zinc oxide | 5–10 |
| Paraquinone dioxime | 0.4–1.6 |

Various portions of Component A and Component B may be mixed. Such a curable, mastic sealant material is discussed in U.S. patent application Ser. No. 371,913 filed June 20, 1973, in the name of G. H. Bowser and entitled "Sealant" which application is a continuation-in-part of U.S. patent application Ser. No. 190,864, filed Oct. 20, 1971, in the name of G. H. Bowser and entitled "Sealant" now abandoned.

As will be appreciated by those skilled in the art, the curable, flowable, mastic sealant is only illustrative of one that may be used. Other types of curable, mastic sealant materials are disclosed in U.S. Pat. No. 3,076,777.

The thermoplastic, spacer-dehydrator element is of the type shown in Table I. As can be appreciated by those skilled in the art, other thermoplastic, spacer-dehydrator elements may be used.

Prior to affixing the composite strip to the edges of a pair of rigid sheets, i.e., glass sheets, the composite strip is heated to a temperature sufficient to make the element plastic but not sufficient to decompose the element.

After the composite strip is heated to soften the spacer-dehydrator element, the composite strip is affixed to the edges of the glass sheets before the mastic sealant material cures. If the mastic sealant material cures before applying the composite strip to the edges of the glass sheets, the sealant will not wet the edges of the glass sheets. When this occurs, a hermetic seal is not formed between the composite strip and the edges of the glass sheets. If the mastic sealant is applied to the edges of the glass sheets and then cures, a hermetic seal will be formed. Therefore, two important factors in practicing this embodiment of the invention are (1) the temperature ranges for heating a composite strip to make the thermoplastic, spacer-dehydrator element plastic and (2) the time period in which the heated composite strip should be used before the mastic sealant cures.

In general, the composite strip is heated to a temperature sufficient to soften the spacer-dehydrator element but not sufficient to decompose the element. For the thermoplastic, spacer-dehydrator element of Table I, the temperature range is 100° F.–400° F.

The time period in which the heated composite strip should be used before the mastic sealant material cures is an important factor. The mastic sealant material which is moisture-resistant must form a hermetic seal between the edges of the glass sheets. Heating the composite strip to soften the spacer-dehydrator element decreases the cure time of the mastic sealant. If the mastic sealant cures before being affixed or applied to the edges of the glass sheets, the mastic sealant will not wet the edges of the glass sheets. When this happens a hermetic seal is not formed. If the composite strip is affixed to the edges of the glass sheets before the mastic sealant material cures, a hermetic seal is formed. Therefore, the time period in which the composite strip should be used is dependent on the mastic sealant material on the composite strip.

For the curable mastic sealant material of Table III, the curing time at a temperature of 100° F. is 8–12 hours. However, it has been found that the element of Table I, at 100° F. picks up sufficient moisture within about 6 hours that makes it unpractical for use in fabricating multiple glazed units. At temperatures above 100° F., the heat drives moisture from the element and the time period is not critical in regard to the element absorbing moisture. At temperatures of 250° F. the curable, mastic sealant material cures in about 5–8 minutes. Therefore, when the mastic sealant material of Table III is used with the element of Table I, the time periods and temperature range is as follows:

| Time period: | Temperature, °F. |
|---|---|
| 8–12 hours (mastic sealant material cures) | |
| 6 hours (to prevent element from absorbing excessive moisture) | 100 |
| 5–8 minutes mastic sealant material cures) | 250 |

In the discussion of the third embodiment of the invention, the composite strip is heated prior to affixing it to the pair of glass sheets. As can be appreciated by those skilled in the art, the composite strip may be affixed to the glass sheets and then heated.

SUMMARY

The step of mitering a resilient thermoplastic, spacer-dehydrator element prior to moving it around corners between a pair of glass sheets can be obviated by heating the element. The element is heated to a temperature sufficient to make the element plastic but not sufficient to decompose the element. As can be appreciated, in certain instances, as in embodiments 1 and 3 of this invention, temperature and time have to be modified to compensate for other factors, e.g., to make the surface of the element viscid; to prevent a curable, mastic sealant material from curing before using the composite strip or to prevent the spacer-dehydrator element from absorbing excessive moisture.

DETAILED DESCRIPTION OF THE INVENTION

The method of the third embodiment of this invention will now be discussed in detail. As will be appreciated, the first and second embodiments may similarly be practiced with modifications that are within the knowledge of those skilled in the art.

A composite strip composed of the mastic sealant material of Table III has a 7–8 mil aluminum foil adhered to one surface and the thermoplastic, spacer-dehydrator element of Table I on the opposite surface. The composite strip is coiled and prepared in a manner disclosed in U.S. Pat. No. 3,669,785. As will be appreciated by those skilled in the art, this type of composite strip is only one of many that may be used and is selected for the sole purpose of describing the steps of the invention. Further, in the discussion, the composite strip will be heated to a temperature of 180° F. and used within a time period of 1½ hours. The time and temperature are selected for purposes of illustration and are not intended to limit the invention thereto. More particularly, a composite strip having the spacer-dehydrator element of Table I and mastic sealant of Table II may be heated to 100° F. and used within 6 hours to prevent the element from picking up excessive moisture or 8–12 hours to prevent the mastic sealant material from curing. When the element is heated to 250° F., it should be used within 5–8 minutes to prevent the mastic sealant material from curing. At a temperature above 100° F. the heat drives moisture from the element and the time period is not critical in regard to the element absorbing moisture. If the composite strip is not affixed to the sheets within the time period for a given temperature, the sealant material will cure and a hermetic seal will not be formed or the element will absorb excessive moisture.

Referring now to the drawings, and in particular with reference to FIG. 1, there is shown a pair of glass sheets 11 and 12 which may be annealed, tempered, colored, laminated, or have other special strength or optical properties. The glass sheets are cut to size and cleaned with alcohol and water and thereafter supported in opposed, spaced relationship to each other by separators 13 which provide a marginal edge spacing between the sheets which is slightly wider than the spacer-dehydrator element. A segment of a composite strip (not shown) or a flat cylindrical coil or package of a composite strip 16 (see FIG. 3) prepared in a manner as disclosed in U.S. Pat. No. 3,669,785 is heated to a temperature of 180° F. The composite strip 16 is composed of an elongated strip of curable, flowable, mastic sealant material 17 of Table III having a 7–8 mil aluminum carrier tape 18 adhered to one surface and a thermoplastic, spacer-dehydrator element 19 of Table I adhered to the opposite surface (see FIG. 4).

Figure 2:
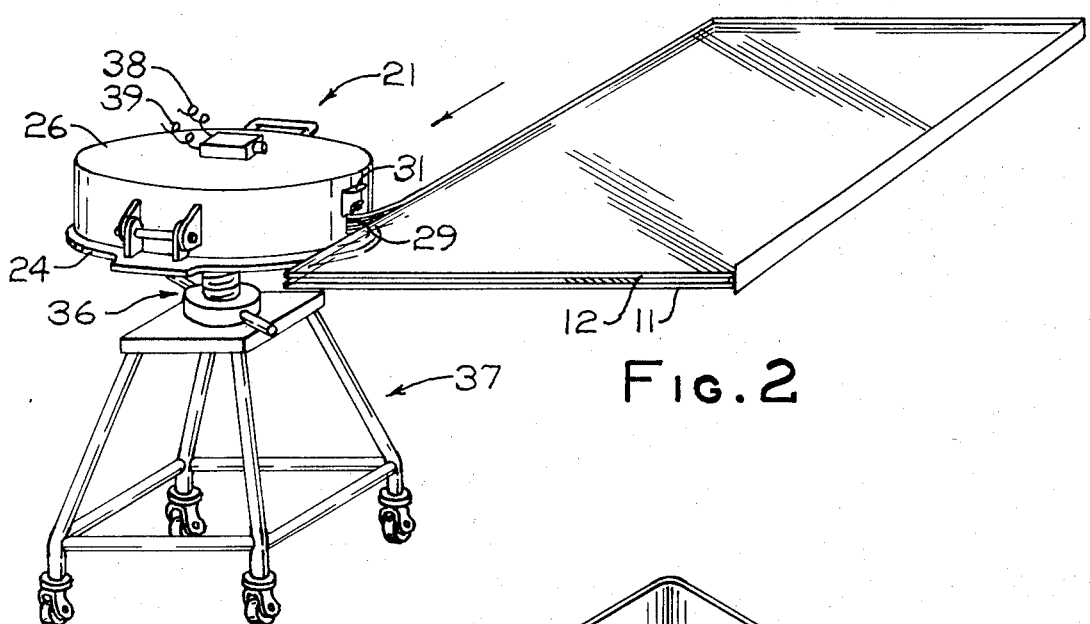
FIG. 2 is a schematic perspective view of an intermediate step in the process of the invention.
Figure 3:
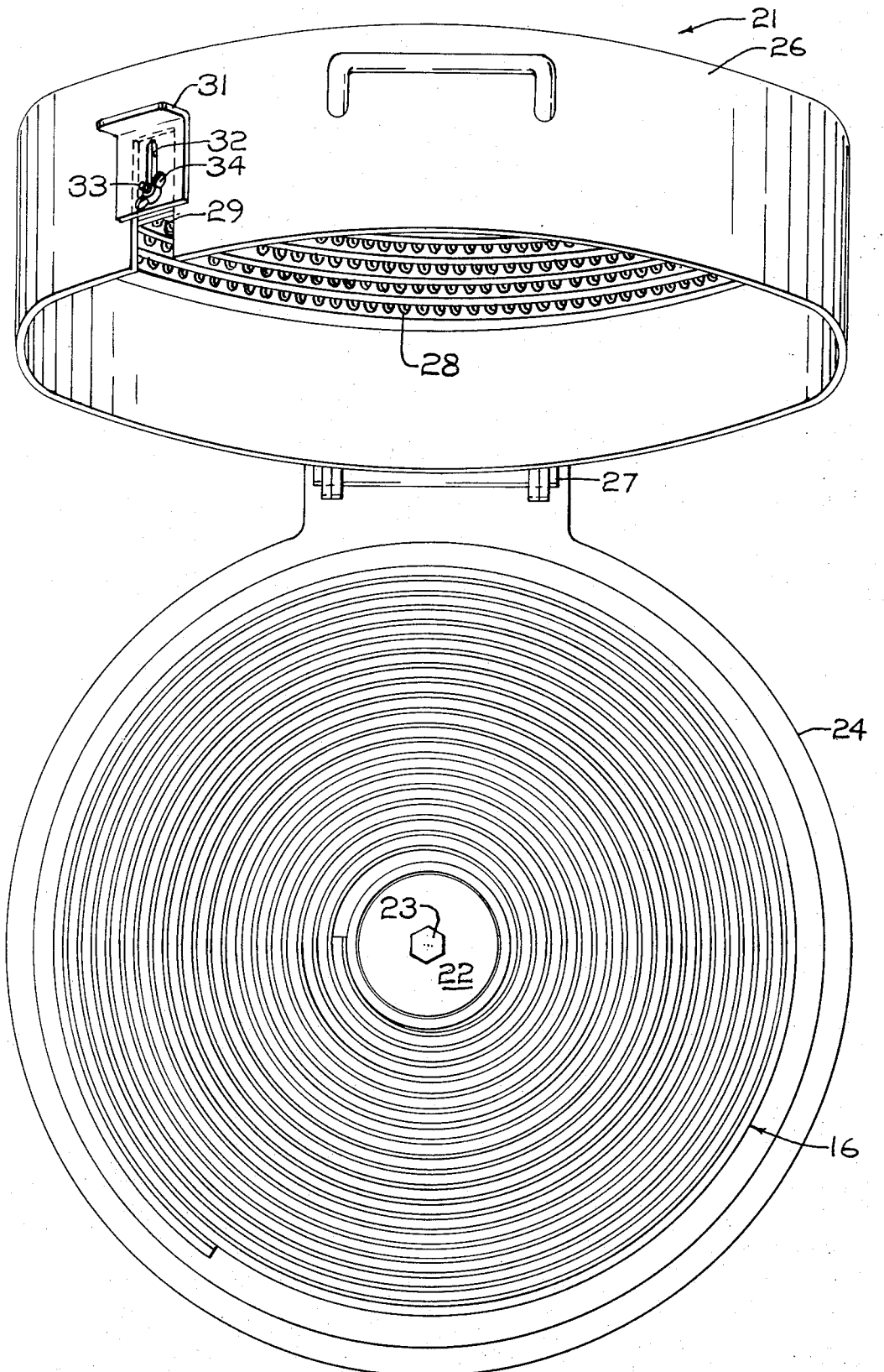
FIG. 3 is a plane view of a heating apparatus which may be used for practicing the method of this invention.

The composite strip 16 may be heated in any conventional heating facility, such as an oven 21 shown in FIGS. 2 and 3, which may be used to heat the coil of the composite element 16. As shown in FIG. 3, the center of the coil of the composite strip 16 is positioned over a member 22 which member is rotatable about a stud 23 mounted to a base 24 of the oven 21. A lid 26 which is mounted for pivotal movement toward and away from the base 24 by way of a hinge 27 is provided with a resistance heating element 28 which is arranged in a coiled array. The heating element 28 may be made of any well-known resistance heating material. Further, as can be appreciated by those skilled in the art, the heating of the coil of the composite element 16 by resistance heating is only illustrative of one of many heating methods that may be used. The heating step should be sufficient to soften the spacer-dehydrator element to make the spacer-dehydrator element plastic, thereby reducing opposed forces generated by bunching of the spacer-dehydrator element but not sufficient to decompose the spacer-dehydrator element.

A groove 29 is provided in the side of the lid 26 so that when the lid is positioned over the coil of the composite strip, the composite strip may subsequently be pulled from the coil while the coil is maintained at temperature, i.e., 180° F. To minimize heat loss by convection and to prevent ingress of moisture in the oven 21 during initial heating of the composite strip, a slide member 31 having a slot 32 formed therein is slidably mounted on a screw 33 and the slide member 31 is held in a selected position by a wing nut 34. The groove 29 is closed during the initial heating and thereafter adjusted to permit the composite strip 16 to be pulled from the oven 21.

The length of the composite strip 16 in the oven should be such that it can be used within 1½ hours after the element is heated to 180° F. This is required because the composite strip has the curable, mastic sealant material of Table III. When the sealant material is heated to 180° F., the curing time is less than 1½ hours. If the mastic sealant cures before being applied to the glass sheets, the edges of the glass sheets do not wet and hermetic seal is not formed. If the composite strip is applied within 1½ hours, the mastic sealant wets the edges of the glass sheets and a hermetic seal is formed.

Although the discussion of the method so far has discussed the steps of supporting the pair of glass plates and thereafter heating the composite strip, it can be appreciated that the steps may be carried out concurrently or in reverse order. Referring now to FIG. 2, the oven 21 is shown mounted on an elevator mechanism 36 which is supported on a movable platform 37. The elevator mechanism is used to adjust the groove 29 of the oven so that as the composite strip is pulled through the groove 29, the element will be aligned with the marginal edges of the glass sheets 11 and 12 such that the spacer-dehydrator element 19 can be inserted between the marginal edges of the glass sheets.

An electric potential (not shown) is applied to the resistance heating element 28 (see FIG. 3) by way of wires 38 and 39 to heat the composite strip 16 (see FIG. 3) to a temperature of 180° F. When the composite strip reaches 180° F., the slide member 31 is adjusted and the leading end of the coil of the composite strip is passed through the groove 29 of the lid 26. The heated strip 16 is applied or urged to the edges of the glass sheets 11 and 12 by inserting the spacer-dehydrator element 19 between the marginal edge portions of the glass sheets with the mastic sealing material contacting the peripheral edges of the glass sheets.

The oven 21 is then moved relative to the pair of glass sheets while pulling the composite strip through the groove from the coil and applying it to the edges of the glass sheets while contemporaneously removing the supports 13 as discussed in the aforementioned U.S. Pat. No. 3,733,237. When the composite strip is completely around the peripheral edges of the glass plates, the composite strip is severed from the coil in any conventional manner. Although in FIG. 2, the oven is shown moving relative to the glass sheets, it can be appreciated by those skilled in the art that the glass sheets can be moved relative to the oven.

Figure 4:
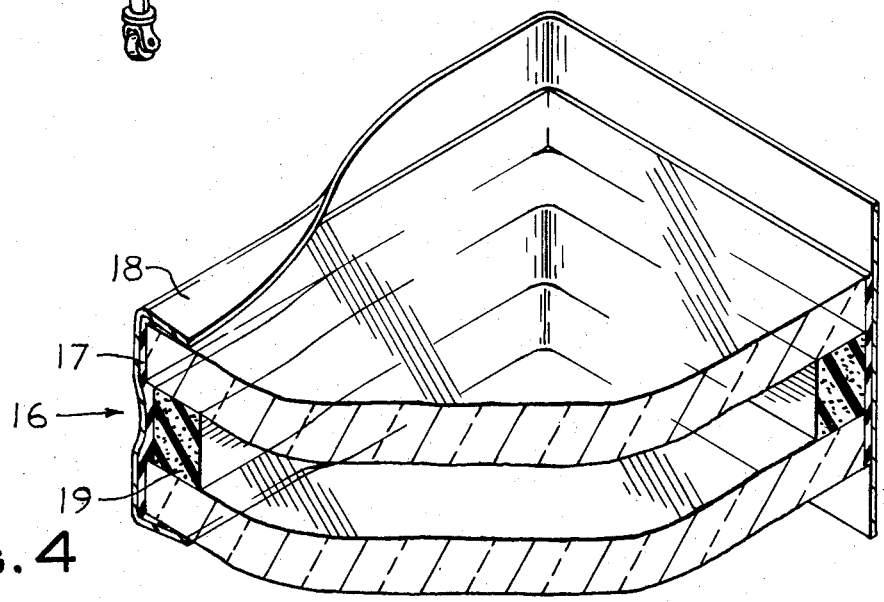
FIG. 4 is a fragmentary view of the pair of glass sheets shown in FIG. 1 showing the position of the composite element as the carrier tape is being pressed against the edges of the glass sheets.

After the composite strip is applied to the edges of the glass sheets and in order to provide a more efficient hermetic seal, the carrier tape 18 is pressed against the edges as by a roller or other suitable pressing device to flow out the mastic sealant material 17 and obtain the desired hermetic seal (see FIG. 4). One such device is disclosed in the aforementioned U.S. Pat. No. 3,733,237.

As can be appreciated, by heating the thermoplastic, spacer-dehydrator element to a temperature at which the element becomes plastic, it is now possible to eliminate the step of mitering the spacer-dehydrator element prior to inserting it between the marginal edges of the glass sheets.

What is claimed is:

1. In a method of fabricating a multiple glazed unit wherein the multiple glazed unit has been fabricated by:
   (a) supporting a pair of glass sheets in opposed spaced relationship to each other;
   (b) applying a segment of a composite strip composed of an elongated strip of flowable, mastic sealant material having a bendable carrier tape adhered to one surface and a heat-softenable, thermoplastic, spacer-dehydrator element adhered to the opposite surface between the edges of the pair of glass sheets such that the spacer-dehydrator element is inserted between opposed, marginal edge portions of the glass sheets with portions of the mastic sealant overlaying the peripheral edges of the glass sheet; and
   (c) pressing the carrier tape so as to flow portions of the mastic sealant into hermetically sealing contact with the edges of the glass sheets, the improvement comprising:
      heating the composite strip prior to the pressing step to a temperature below decomposition temperature of the spacer-dehydrator element and for a period of time sufficient to render the spacer-dehydrator element reshapeable under pressure wherein opposed forces generated by bunching of the spacer-dehydrator element are minimized.

2. A method of fabricating a multiple glazed unit comprising the steps of:
   (a) supporting a pair of rigid sheets in opposed, spaced relationship;
   (b) providing a length of a thermoplastic, spacer-dehydrator element;
   (c) heating the spacer-dehydrator element to a temperature below decomposition temperature of the spacer-dehydrator element and for a period of time to (1) make the surfaces of the element viscid and (2) make the spacer-dehydrator element reshapeable under pressure wherein opposed forces generated by bunching of the spacer-dehydrator element are minimized;
   (d) positioning the heated element between the pair of sheets to define a compartment between the sheets;
   (e) urging the sheets toward each other about the heated element; and
   (f) releasing the sheets when the element has cooled below that temperature at which the surfaces became viscid.

3. The method as set forth in Claim 2 wherein said rigid sheets are glass sheets.

4. The method as set forth in Claim 2 wherein the element is heated to a temperature range of 275° F. to 400° F.

5. A method of fabricating a multiple glazed unit comprising the steps of:
   (a) supporting a pair of rigid sheets in opposed spaced relationship;
   (b) providing a length of a resilient, thermoplastic, spacer-dehydrator element between the sheets;
   (c) heating the spacer-dehydrator element to a temperature below decomposition temperature of the spacer-dehydrator element and for a period of time to (1) make the surfaces of the element viscid and (2) make the element reshapeable under pressure wherein opposed forces generated by bunching of the element are minimized;
   (d) urging the sheets together about the heated element; and
   (e) releasing the sheets when the spacer-dehydrator element has cooled below that temperature at which the surfaces became viscid.

6. The method of fabricating multiple glazed units as set forth in Claim 5 wherein said heating step and urging step are performed simultaneously.

7. The method as set forth in Claim 5 wherein the element is heated to a temperature range of 275° F. to 400 F.

8. A method of fabricating a multiple glazed unit comprising the steps of:
   (a) supporting a pair of rigid sheets in opposed, spaced relationship to each other;
   (b) providing a length of a composite strip composed of a precured, flowable sealant material having a bendable carrier tape adhered to one surface and a thermoplastic spacer-dehydrator element adhered to the opposite surface;
   (c) heating the composite strip to a temperature below decomposition temperature of the spacer-dehydrator element and for a period of time sufficient to render the spacer-dehydrator element reshapeable under pressure wherein opposed forces generated by bunching of the spacer-dehydrator element are minimized; and subsequently
   (d) urging the heated composite strip against the edges of the pair of sheets such that the element is inserted between opposed, marginal edge portions of the glass sheets with the sealant material overlaying the peripheral edges of the sheets.

9. The method as set forth in Claim 8 wherein the rigid sheets are glass sheets.

10. The method as set forth in Claim 8 wherein the composite strip is heated to a temperature range of 100° F. to 400° F.

11. The method as set forth in Claim 9, including the step of:
   pressing the carrier tape after said urging step so as to flow portions of the sealant material into hermetically sealing contact with the edges of the glass sheets.

12. A method of fabricating a multiple glazed unit comprising the steps of:
(a) supporting a pair of rigid sheets in opposed, spaced, relationship to each other;
(b) providing a length of a composite strip composed of a precured, flowable, mastic sealant material having a bendable carrier tape adhered to one surface and a resilient, thermoplastic, spacer-dehydrator element adhered to the opposite surface;
(c) urging the composite strip against the edges of the pair of sheets such that the spacer-dehydrator element is inserted between opposed, marginal edge portions of the sheets with the sealant material overlaying the peripheral edges of the sheets; and
(d) heating the composite strip to a temperature below decomposition temperature of the spacer-dehydrator element and for a period of time sufficient to render the spacer-dehydrator element reshapeable under pressure wherein opposed forces generated by bunching of the spacer-dehydrator element are minimized.

13. The method as set forth in Claim 12 wherein the composite strip is heated to a temperature range of 100° F. to 400° F.

14. The method as set forth in Claim 12 including the step of:
pressing the carrier tape after said heating step so as to flow portions of the sealant material into hermetically cealing contact with the edges of the sheets.

15. A method of fabricating a multiple glazed unit comprising the steps of:
(a) supporting a pair of rigid sheets in opposed, spaced relationship to each other;
(b) providing a length of a composite strip composed of a curable, flowable, mastic sealant material having a bendable carrier tape adhered to one surface and a thermoplastic, spacer-dehydrator element adhered to the opposite surface;
(c) heating the composite strip to a temperature below decomposition temperature of the spacer-dehydrator element and for a period of time sufficient to render the spacer-dehydrator element reshapeable under pressure wherein opposed forces generated by bunching of the spacer-dehydrator element are minimized;
(d) urging the heated composite strip against the edges of the pair of sheets such that the spacer-dehydrator element is inserted between opposed, marginal edge portions of the sheets with the sealant material overlaying the peripheral edges of the sheets; and
(e) performing said urging step prior to a time at which the sealant material cures.

16. The method as set forth in Claim 15 wherein the rigid sheets are glass sheets.

17. The method as set forth in Claim 15 wherein the composite strip is heated to a temperature range of 100° F. to 250° F. and performing said urging step within a time period of less than 6 hours but greater than 5 minutes.

18. The method as set forth in Claim 15 including the step of:
pressing the carrier tape after said urging step and prior to the time at which the sealant material cures so as to flow portions of the sealant material into hermetically sealing contact with the edges of the sheets.

19. A method of fabricating a multiple glazed unit comprising the steps of:
(a) supporting a pair of glass sheets in opposed, spaced, parallel relationship to each other;
(b) providing a coil of a composite strip composed of an elongated strip of curable, flowable, mastic sealant material having a bendable carrier tape adhered to one surface and a thermoplastic, spacer-dehydrator element adhered to the opposite surface;
(c) heating the composite strip to a temperature below decomposition temperature of the spacer-dehydrator element and for a period of time sufficient to render the spacer-dehydrator element reshapeable under pressure wherein opposed forces generated by bunching of the spacer-dehydrator element are minimized;
(d) applying a segment of the heated composite strip against the edges of the glass sheets such that the spacer-dehydrator element is inserted between opposed, marginal edge portions of the glass sheets with the mastic sealant overlaying the peripheral edges of the glass sheets;
(e) severing the segment of the composite strip from the heated coil of the composite strip;
(f) pressing the carrier tape so as to flow portions of the mastic sealant material into hermetically sealing contact with the edges of the glass sheets; and
(g) performing steps prior to a time at which the sealant material cures.

20. The method as set forth in Claim 19 wherein the composite strip is heated to a temperature range of 100° F. to 250° F. and performing said applying, severing and urging steps between a time period of less than 6 hours but greater than 5 minutes.

21. A method of fabricating a multiple glazed unit comprising the steps of:
(a) supporting a pair of rigid sheets in opposed, spaced relationship to each other;
(b) providing a length of a composite strip composed of a curable, flowable, sealant material having a bendable carrier tape adhered to one surface and resilient, thermoplstic spacer-dehydrator element adhered to the opposite surface;
(c) urging the composite strip against the edges of the pair of sheets such that the spacer-dehydrator element is inserted between opposed, marginal edge portions of the sheets with the sealant material overlaying the peripheral edges of the sheets; and
(d) heating the composite strip to a temperature below decomposition temperature of the spacer-dehydrator element and for a period of time sufficient to render the spacer-dehydrator element reshapeable under pressure wherein opposed forces generated by bunching of the spacer-dehydrator element are minimized.

22. The method as set forth in Claim 21 wherein the composite strip is heated to a temperature range of 100° F. to 250° F.

References Cited

UNITED STATES PATENTS

| | | | |
|---|---|---|---|
| 2,974,377 | 3/1961 | Kunkle | 52—616 |
| 3,657,900 | 4/1972 | Bowser et al. | 52—616 X |
| 3,669,785 | 6/1972 | Bowser et al. | 156—109 |
| 3,733,237 | 5/1973 | Wolff | 156—109 X |

FOREIGN PATENTS

| | | | |
|---|---|---|---|
| 1,201,033 | 8/1970 | Great Britain | 156—107 |

PHILIP DIER, Primary Examiner

U.S. Cl. X.R.

52—172, 616; 156—109; 161—45; 206—59; 260—33.6, 846

UNITED STATES PATENT OFFICE
CERTIFICATE OF CORRECTION

Patent No. 3,832,254　　　　　　　　　　Dated　August 27, 1974

Inventor(s) George H. Bowser and Renato J. Mazzoni

It is certified that error appears in the above-identified patent and that said Letters Patent are hereby corrected as shown below:

Claim 14, Column 11, line 28, "cealing" should be --sealing--.

Claim 19, Column 12, line 23, after "performing" and before "steps" insert -- said applying, severing and pressing--.

Claim 21, Column 12, line 36, after "and" and before "resilient" insert --a--.

Claim 21, Column 12, line 37, "thermoplstic" should be --thermoplastic--.

Signed and sealed this 26th day of November 1974.

(SEAL)
Attest:

McCOY M. GIBSON JR.　　　　　　　　C. MARSHALL DANN
Attesting Officer　　　　　　　　　　Commissioner of Patents